(12) United States Patent
Babej et al.

(10) Patent No.: US 6,986,629 B2
(45) Date of Patent: Jan. 17, 2006

(54) SECTION FOR THE MANUFACTURE OF HOLLOW BODY ELEMENTS, HOLLOW BODY ELEMENT AND COMPONENT ASSEMBLY

(75) Inventors: Jiri Babej, Lich (DE); Michael Vieth, Bad Vilbel (DE); Richard Humpert, Hohe (DE)

(73) Assignee: Profil Verbindungstechnik GmbH & Co. KG (DE)

( * ) Notice: Subject to any disclaimer, the term of this patent is extended or adjusted under 35 U.S.C. 154(b) by 279 days.

(21) Appl. No.: 10/261,992

(22) Filed: Oct. 1, 2002

(65) Prior Publication Data
US 2003/0190214 A1 Oct. 9, 2003

(30) Foreign Application Priority Data
Apr. 3, 2002 (DE) .................................. 202 05 192 U

(51) Int. Cl.
*F16B 37/04* (2006.01)

(52) U.S. Cl. ........................................ 411/180; 411/179
(58) Field of Classification Search ................ 411/172, 411/176, 184, 179, 180, 181; 29/432–432.2, 29/512
See application file for complete search history.

(56) References Cited

U.S. PATENT DOCUMENTS

| | | | |
|---|---|---|---|
| 2,096,623 A | | 10/1937 | Almdale |
| 2,206,740 A | | 7/1940 | Burke et al. |
| 2,486,769 A | * | 11/1949 | Watson .................. 411/180 |
| 3,253,631 A | * | 5/1966 | Reusser .................. 411/179 |
| 3,469,613 A | * | 9/1969 | Steward .................. 411/179 |
| 3,878,598 A | | 4/1975 | Steward .................. 29/432.2 |
| 3,878,599 A | * | 4/1975 | Ladouceur et al. ........ 29/432.2 |
| 3,926,236 A | * | 12/1975 | Pouch et al. ............. 411/179 |
| 3,999,659 A | | 12/1976 | Grube ................... 206/343 |
| 4,690,599 A | * | 9/1987 | Shinjo .................... 411/180 |
| 5,340,251 A | * | 8/1994 | Takahashi et al. ......... 411/179 |
| 6,220,804 B1 | * | 4/2001 | Pamer et al. ............. 411/180 |
| 6,276,040 B1 | * | 8/2001 | Muller .................. 29/432.2 |

FOREIGN PATENT DOCUMENTS

WO    WO 01/72449 A3    10/2001

* cited by examiner

*Primary Examiner*—Flemming Saether
(74) *Attorney, Agent, or Firm*—Greenberg Traurig LLP; Eugene C. Rzucidlo

(57) ABSTRACT

A section (10; 110) is provided for the manufacture of hollow body elements, in particular for the manufacture of pierce and rivet nuts having a square or rectangular outline in plan view and a ring-like piercing section (36; 236) at a side confronting a component consisting of a sheet metal material or the like. The section (10; 210) is at least substantially rectangular in cross-section with two bars (14, 16; 214, 216) at the side (12; 212) later confronting the component. The bars are spaced apart and extend parallel to the longitudinal sides (18, 20; 218, 220) of the section, are likewise at least substantially rectangular in cross-section and form, in the finished element (11, 211), a feature providing security against rotation. The bars respectively each have an inclined flank (68, 70; 268, 270) at the inner side which forms an undercut (69, 71; 269, 271). The specification also describes and claims hollow body elements made from such a section and component assemblies formed by attaching such hollow body elements to sheet metal parts.

16 Claims, 17 Drawing Sheets

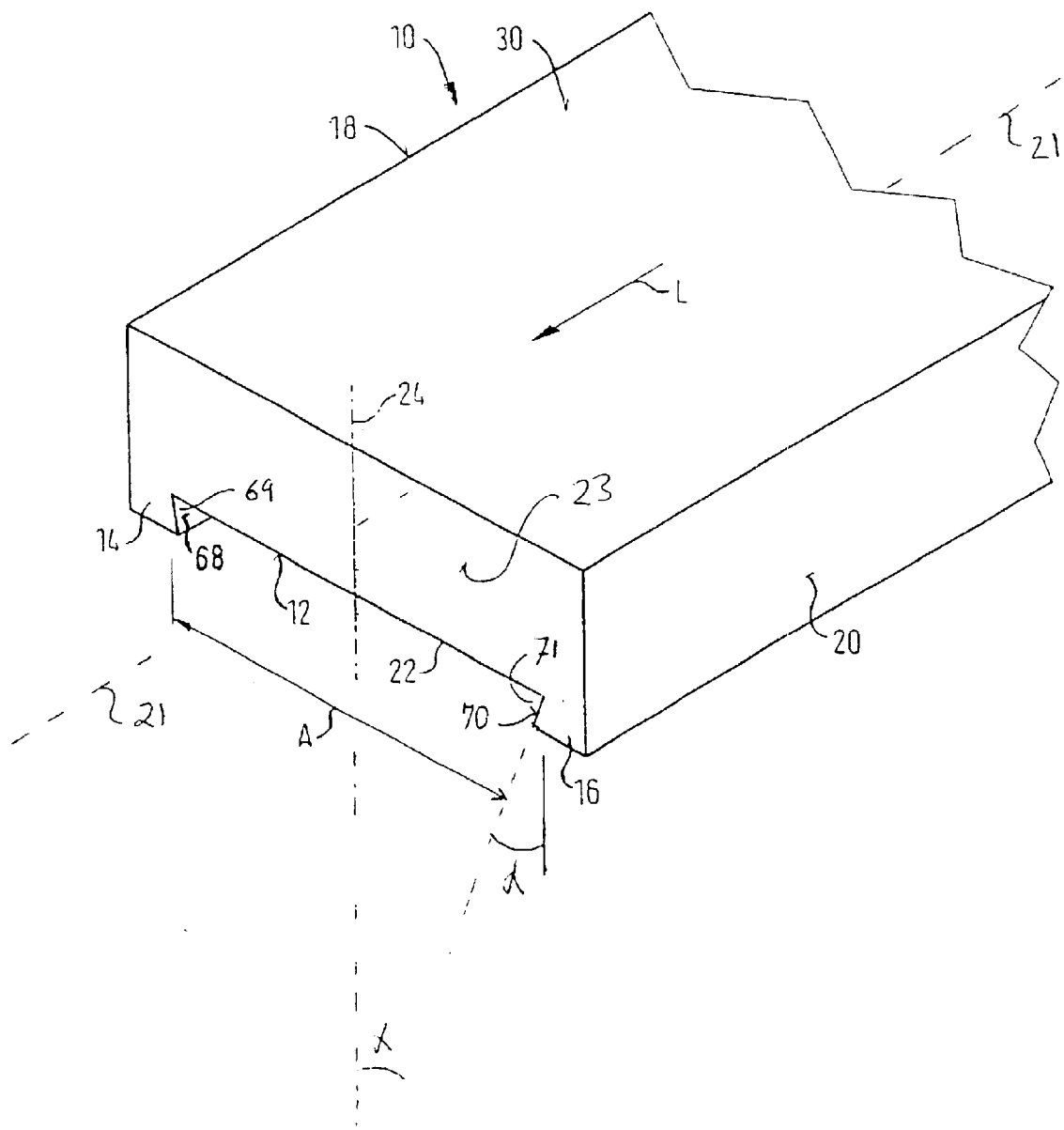

(HALF) CROSS-SECTION OF THE SECTION

OP 1
UPSETTING

OP 2
INDENT TO FORM BREAK-AWAY EDGE

OP 3
HOLE FORMING

OP 4
DILATION

THREAD BORING

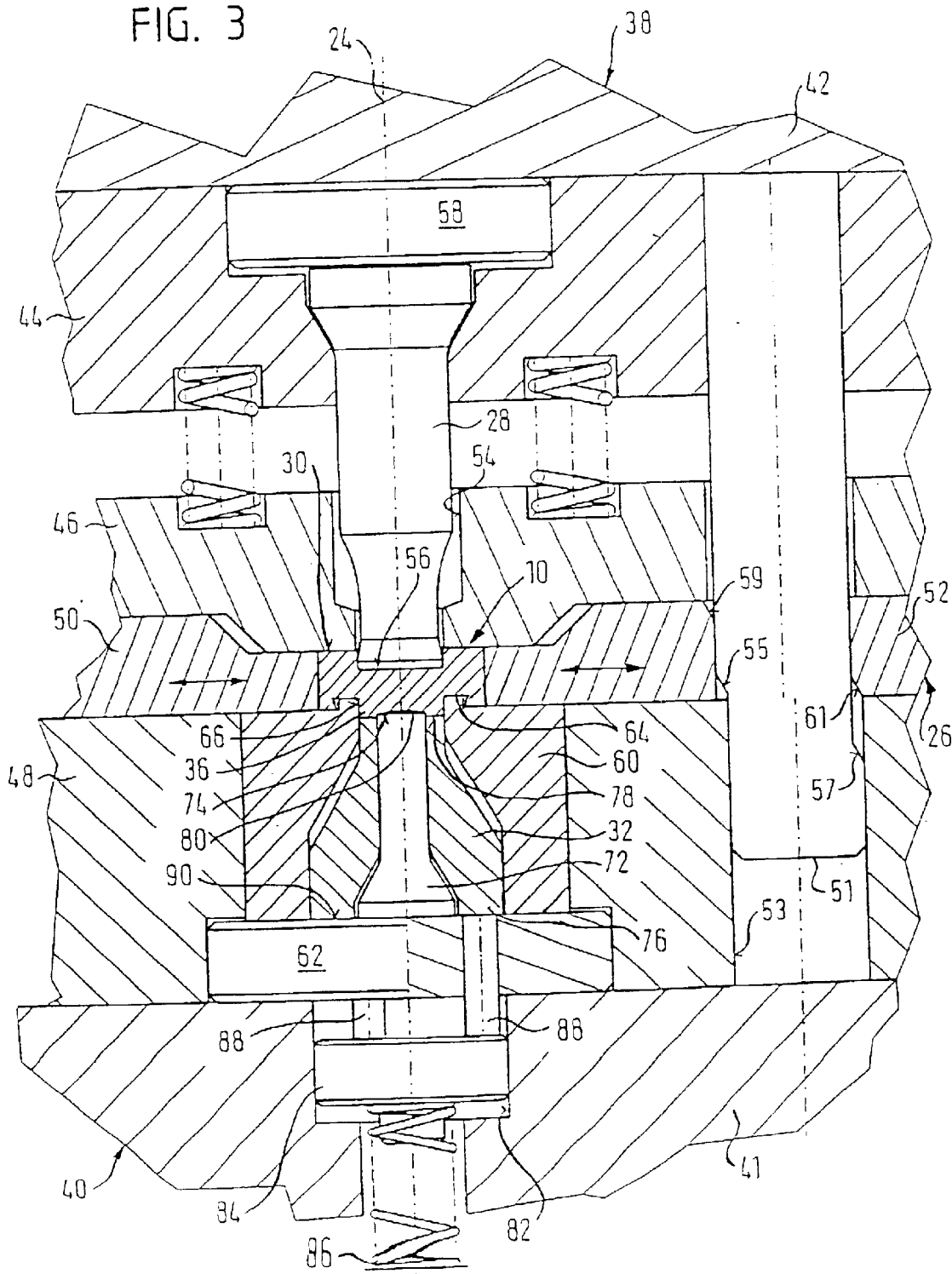

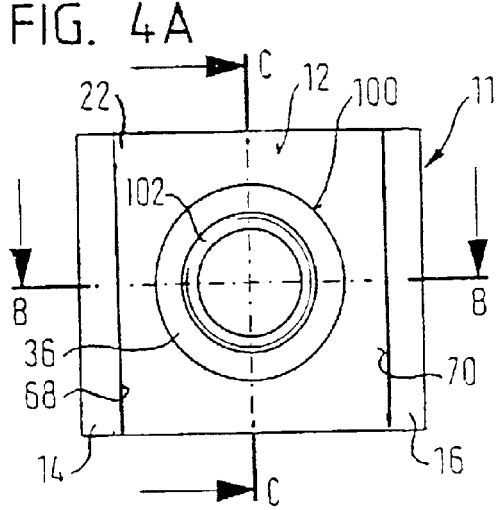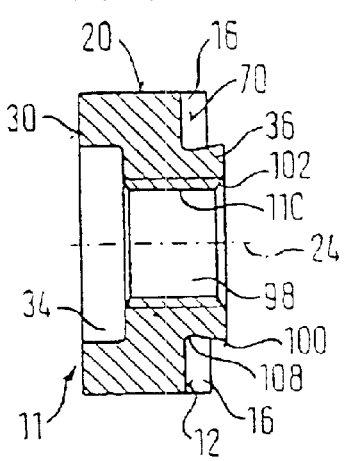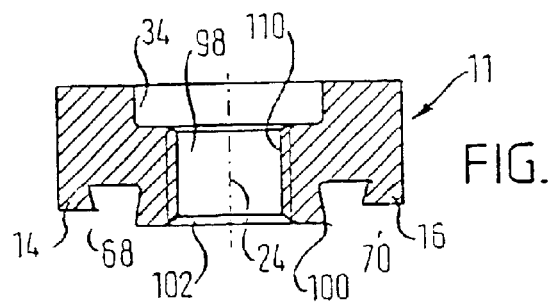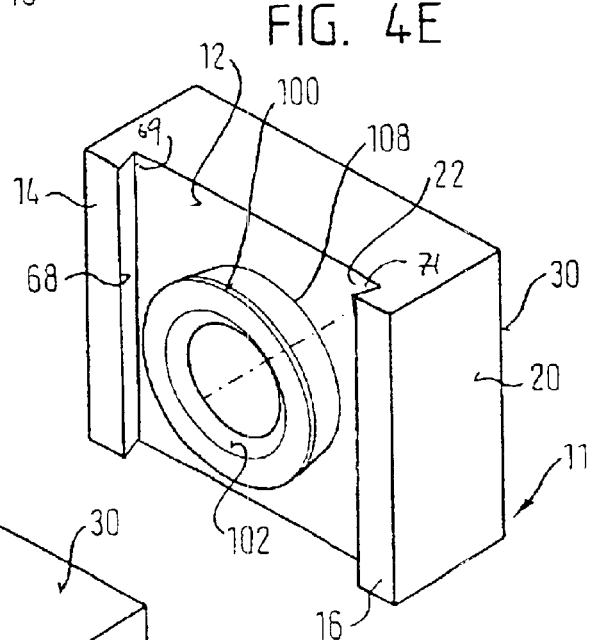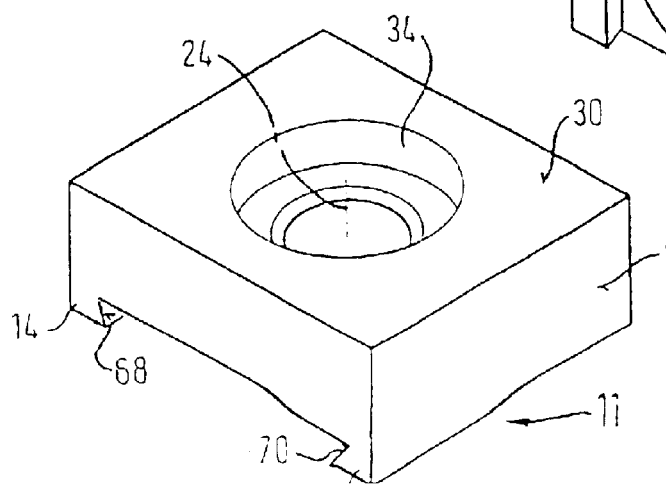

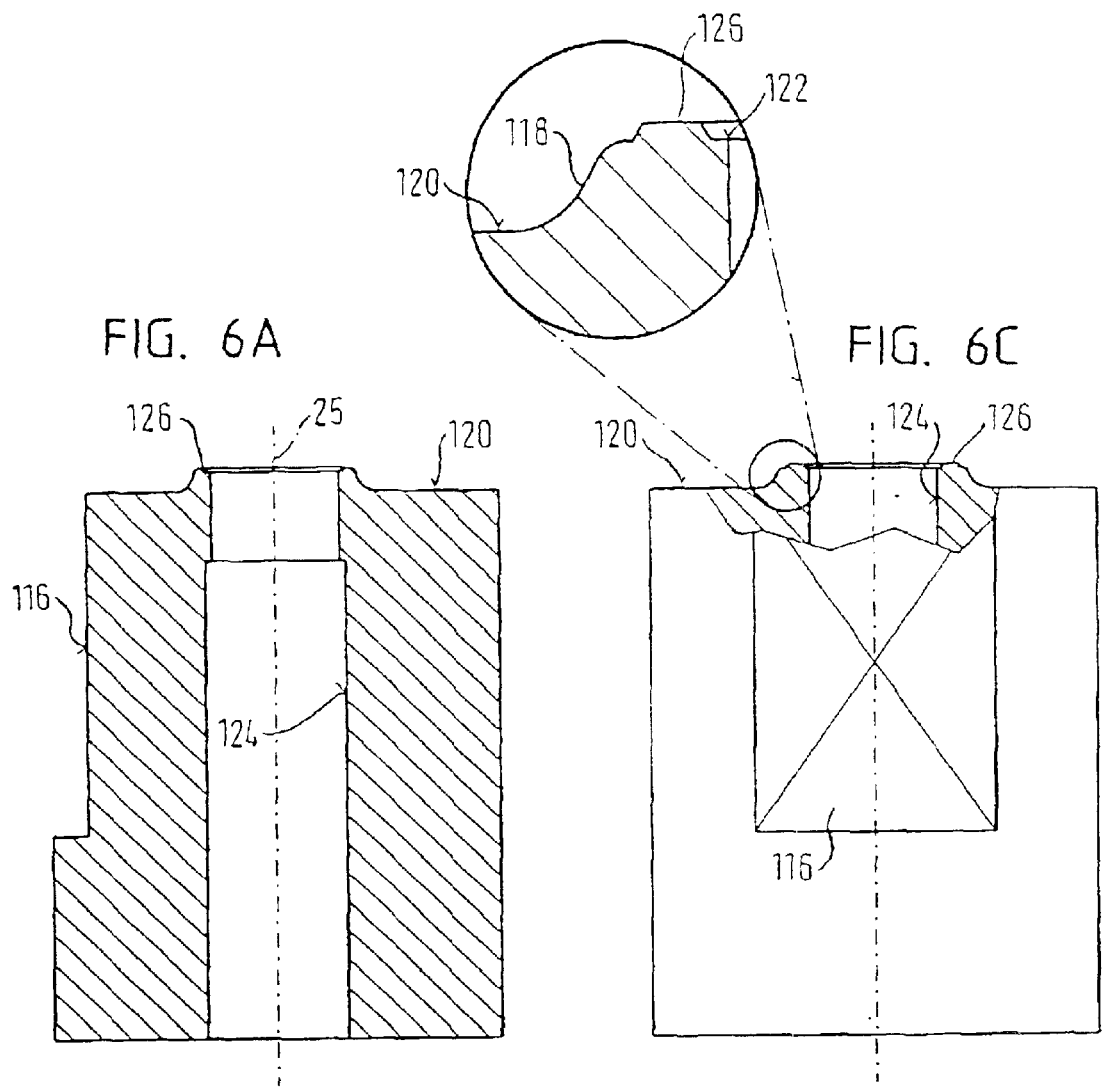
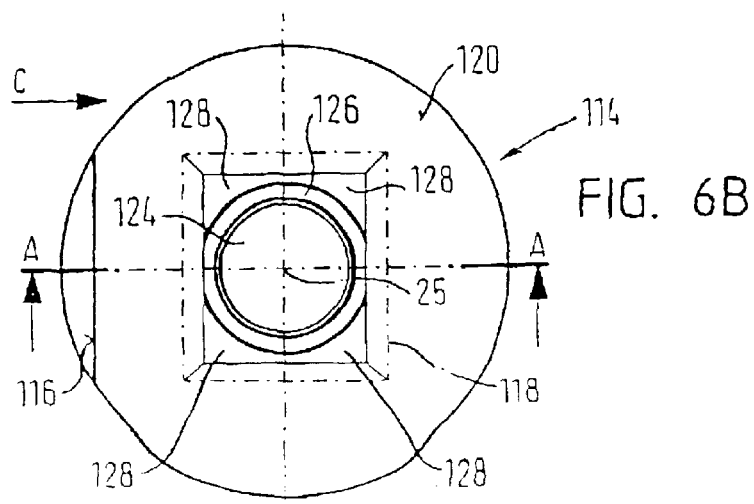

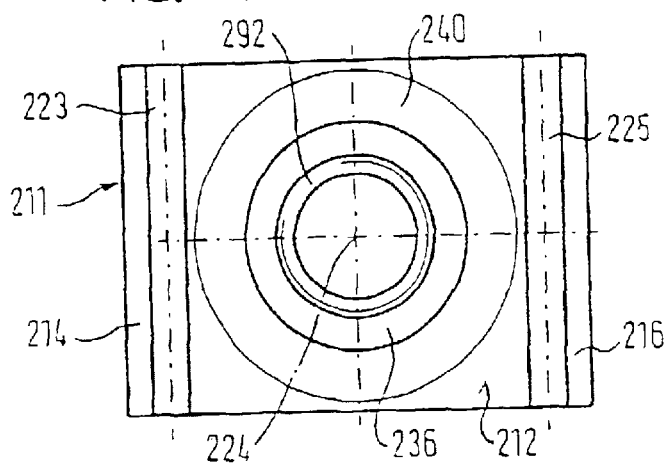
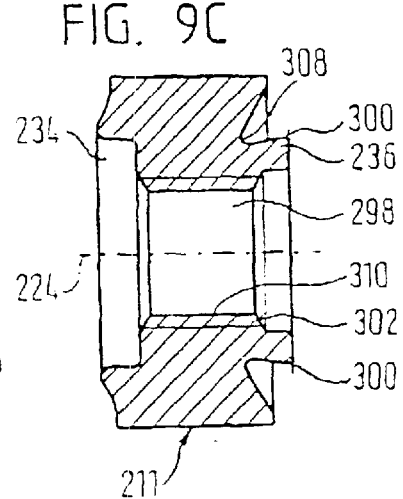
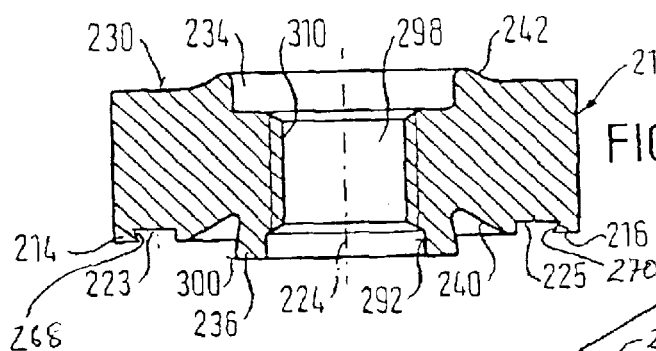
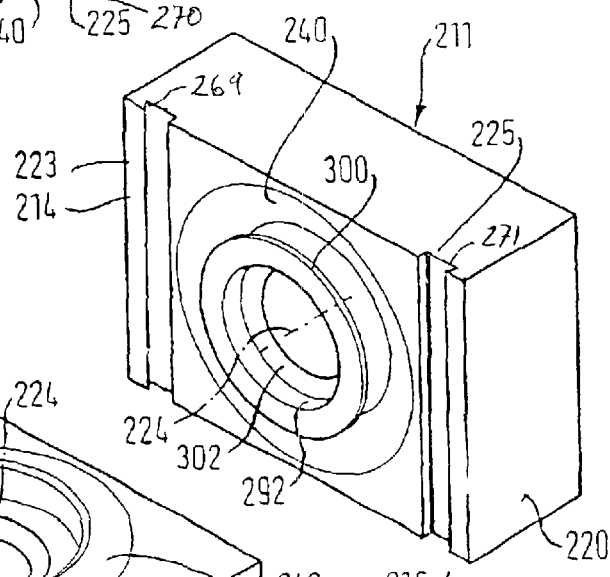
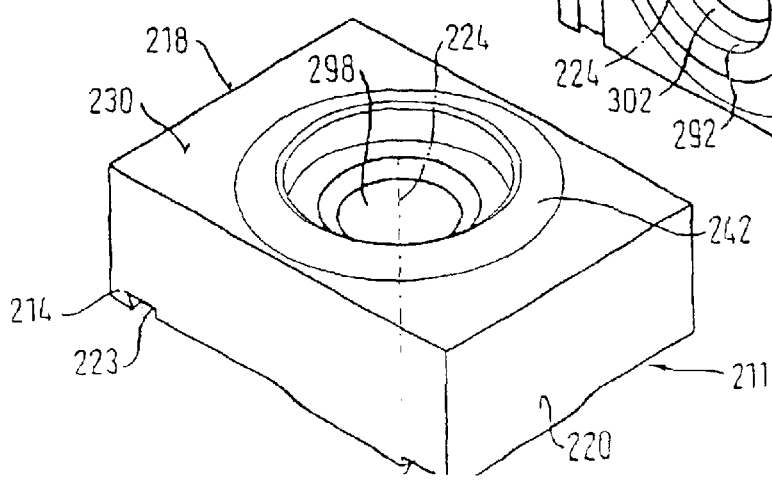

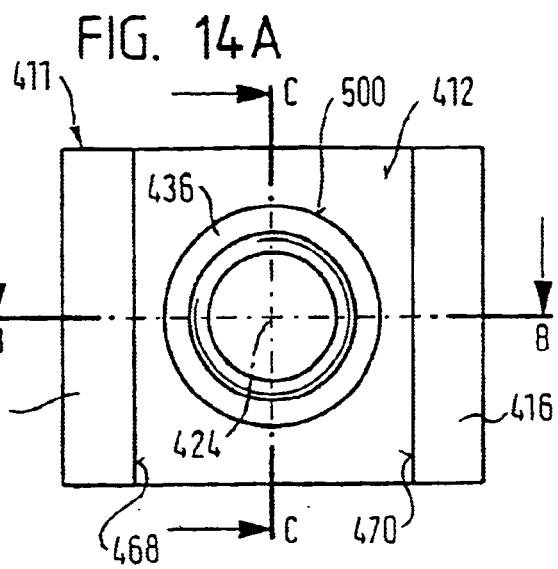
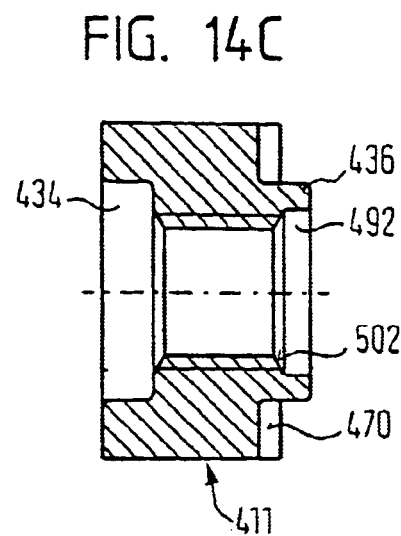
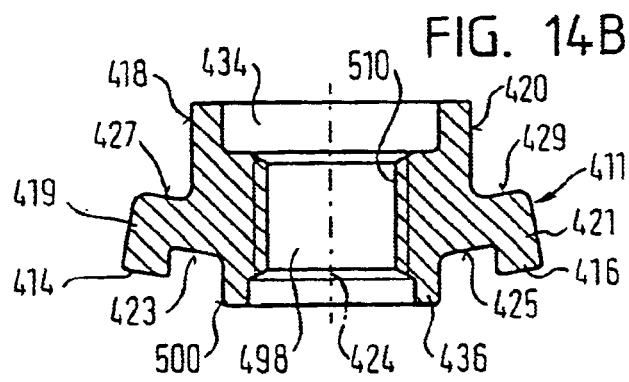
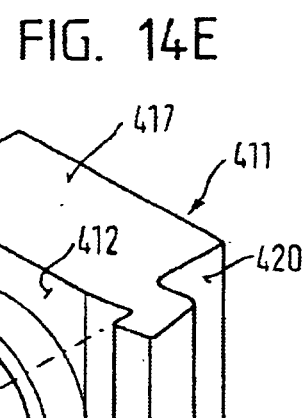
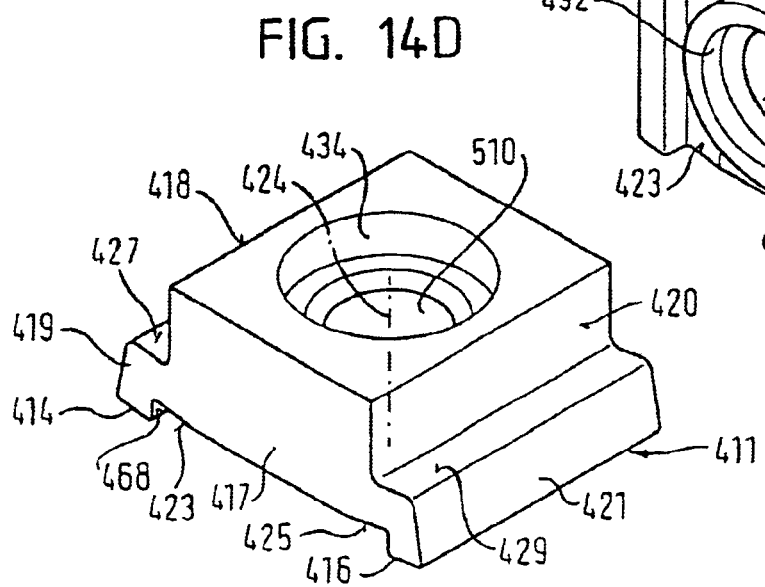

SECTION FOR THE MANUFACTURE OF HOLLOW BODY ELEMENTS, HOLLOW BODY ELEMENT AND COMPONENT ASSEMBLY

FIELD OF THE INVENTION

The present invention relates to a section for the manufacture of hollow body elements, in particular for the manufacture of pierce and rivet nuts having a square or rectangular outline in plan view which are to be provided in a later process with a ring-like piercing section at a side confronting a component consisting of a sheet metal material or the like. Furthermore, the invention relates to hollow body elements which are manufactured from portions of the section and also to component assemblies which result from attachment of the hollow body elements to components.

BACKGROUND OF THE INVENTION

Methods for the manufacture of hollow body elements, such as nut elements, for the attachment to components normally consisting of sheet metal are known. In such known methods the hollow body elements are provided with an at least substantially square or rectangular outline by cutting off individual lengths of the section, which is present in the form of a bar section or of a coil after the previous punching of respective apertures in the section, optionally with the subsequent formation of a thread cylinder.

A method of the initially named kind and also the corresponding hollow body elements are for example known from U.S. Pat. No. 4,971,499. Hollow body elements are also sold by the Company Profil Verbindungstechnik GmbH & Co. KG in Germany under the designation HI rectangular nuts.

SUMMARY OF THE INVENTION

The object of the present invention is to provide a section from which hollow body elements, in particular rectangular nut elements can be produced with favourably priced manufacture, with the hollow body elements having improved mechanical characteristics in comparison to known elements and after attachment to a component of sheet metal, for example a higher pull-out resistance and an improved security against rotation. Moreover, such hollow body elements should show a reduced notching action so that the fatigue characteristics of component assemblies comprising a component normally consisting of sheet metal and hollow body elements attached to the latter are also improved under dynamic loads.

In order to satisfy this object a section of the initially named kind is provided which is characterised in that, the section is at least substantially rectangular in cross-section with two bars at the side later confronting the component which are spaced apart and extend parallel to the longitudinal sides of the section, are likewise at least substantially rectangular in cross-section and form, in the finished element a feature providing security against rotation and in that the bars respectively have an inclined flank at the inner side which forms an undercut.

The ring-like piercing section which lies at the centre of the element can be circular, oval or polygonal. In all these forms the notch action is significantly reduced relative to a rectangular piercing section as in the prior art. Through the undercuts in the region of the bars an excellent press-out resistance and a high security against rotation are achieved.

The manufacture from a section, which is present either in the form of a bar section or in the form of a coil in which the section already has the basic shape of the element, makes it possible to dispense with comparatively costly cold heading machines and permits instead of this the manufacture of the elements in a normal punching press which is equipped with progressive tooling for carrying out the individual manufacturing steps. The manufacture in a punching press utilizing progressive tooling is particularly cost favourable in comparison to the use of cold heading machines. Manufacture on a transfer press is also possible under the same conditions. In this arrangement the separating process must be displaced into the first stage.

Particularly favourable sections for manufacturing hollow body elements result from the sections which are able to be manufactured by cold rolling, for example from a 35B2 steel material. The particular sections of the invention lead, on the one hand, to elements which are favourable weight-wise and, on the other hand, also to elements which can be manufactured at favourable cost and to elements which have excellent mechanical characteristics.

With a hollow body element for the attachment to a component, in particular to a component consisting of sheet metal, in which the hollow body element has bars at two opposite sides extending parallel to one another which form a security against rotation with the component and a centrally arranged punched aperture extending perpendicular to the component side, the punched aperture optionally having a thread cylinder, the invention provides that a ring-like projection is present at the side of the hollow body element that faces the component and concentric to the punched aperture, the ring-like projection being formed as a piercing section and that a recessed region is present between the bars and the ring-like piercing section, with bars only being present at two opposite sides of the hollow body element and having an inclined flank at the side facing the ring-like piercing section which forms an undercut.

Since a ring-like piercing section is present a ring-like slug is punched out of the component during the attachment of the hollow body element so that a notch effect in the region of the circular aperture produced in the component need no longer be feared. That is to say the rectangular edges present in the known elements, which arose as result of the previous rectangular piercing section are, so to say, omitted. In this connection it is noted that in the prior art the rectangular piercing section is defined by the cross-section of the section that is used, whereas in the present invention one makes use of the special piercing section which is produced in accordance with the invention by an upsetting process.

Particularly favourable variants of the hollow body element result from the claims 6 to 14.

Further advantages of the section of the invention, of the hollow body element of the invention and of the component assemblies in accordance with the invention are to be found in the following description of preferred examples which are explained further with reference to the drawings. In the drawings are shown:

BRIEF DESCRIPTION OF THE FIGURES

FIG. 1 a perspective representation of a section of a first section in accordance with the invention for the manufacture of hollow body elements, FIGS. 2A–F a series of drawings which show the individual method steps which are required in order to manufacture a hollow body element in accordance with the invention from the section of FIG. 1, FIG. 3 a partly sectioned drawing to explain the carrying out of the upsetting process in accordance with FIG. 2B in a station of progressive tooling in a punching press, FIGS. 4A–F a series of drawings to set forth the precise shape of the hollow body element in accordance with the invention manufactured from the section of FIG. 1, FIG. 5 a partly sectioned representation of a component assembly comprising a sheet metal part and a hollow body element in accordance with the invention attached thereto, the hollow body element being in accordance with FIG. 4, FIGS. 6A–C drawings to explain the design of a die in accordance with the invention for the attachment of the element of FIG. 4 to a sheet metal part, FIG. 7 a drawing for the representation of the attachment of a further component to the component assembly of FIG. 5, FIG. 8 a perspective representation of a section of a second section of the invention for the manufacture of hollow body elements, FIGS. 9A–E a series of drawings to set forth the precise form of the hollow body elements in accordance with the invention manufactured from the section of FIG. 8, FIG. 10 a partly sectioned illustration of a component assembly comprising a sheet metal part and a hollow body element in accordance with the invention attached thereto, the hollow body element being in accordance with FIGS. 9A to E, FIG. 11 a drawing to represent the attachment of a further component to the component assembly of FIG. 10, FIGS. 12A+B drawings to explain the design of a die in accordance with the invention for the attachment of the elements in accordance with the FIGS. 9A to 9E to a sheet metal part, FIG. 13 a perspective illustration of an earlier proposed section for the manufacture of hollow body elements, FIGS. 14A–E a series of drawings to set forth the precise form of the hollow body element in accordance with the invention manufactured from the section of FIG. 13, FIG. 15 a partly sectioned representation of a component assembly comprising a sheet metal part and a hollow body element in accordance with FIGS. 14A to 14E attached thereto, FIG. 16 a drawing for the representation of the attachment of a further component to the component assembly of FIG. 15, and FIGS. 17A–C drawings to explain the design of a die for the attachment of the element in accordance with the FIGS. 14A to 14E to a sheet metal part.

DETAILED DESCRIPTION OF THE FIGURES

Figure 2A:
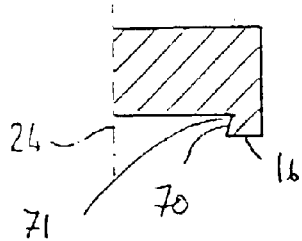

FIG. 1 shows a perspective representation of a first section 10 in accordance with the invention which can be used for the manufacture of hollow body elements 11 (FIG. 4) in accordance with the invention. The section 10 is present either in the form of a bar of for example 6 meters length or is delivered by the material manufacturer in the form of a coil. It is a cold rolled section. Preferred materials are all steel types in accordance with DIN 1654, but also NE-metals such as aluminium or the like.

The section is at least substantially rectangular in cross-section and has additionally two bars 14, 16 having a spacing A from one another at the side 12 which later faces the component. The bars extend parallel to the longitudinal sides 18 and 20 of the section 10 and are approximately trapezoidal in cross-section. However, they only have one inclined inner side or flank 68, 70. One can also consider the shape of the section in such a way that it is at least substantially rectangular with a broad, but not very deep groove 22 of trapezoidal cross-section at the side 12 facing the component, with the groove 22 likewise extending parallel to the longitudinal sides 18, 20 of the section.

The reference numeral 21 points to the central longitudinal axis of the section the "end face" 23 of which represents any desired plane of the section standing perpendicular to the central longitudinal axis 21 (since the section continues on the left-hand side of the plane 23). The axis 24 likewise stands perpendicular to the central longitudinal axis 21 of the section and forms, as will be explained later, the central axis of the ring-like piercing section which has yet to be formed for a hollow body element later manufactured from the section.

As indicated in the drawing of FIG. 1 the inclined flank 70 forms an angle α in the plane 23 with this axis 24. The same applies for the flank 68 (although the angle α is not drawn in there). The angle α preferably lies in the range between 3° and 45°, in particular between 7° and 30°.

In this example an element 11 in accordance with the FIGS. 4A–F is manufactured from the section in accordance with the invention of FIG. 1. The general shape of the element, which is straightforwardly evident from FIG. 4 will first be described in more detail later. First of all the manufacturing method will be explained in more detail with reference to the FIGS. 2A–2F and with reference to FIG. 3. FIGS. 2A–F all show a cross-section (partly only a half section) through the section 10 of FIG. 1 perpendicular to its longitudinal extent L, with the axis 24 in FIG. 2 corresponding to the axis 24 of FIG. 1 and being arranged perpendicular to the longitudinal extent L of the section 10. The cross-sectional plane also stands perpendicular to the longitudinal direction L.

The section 10 runs in the longitudinal direction L in a punching press 38 equipped with progressive tooling 26 (FIG. 3) with the progressive tooling having five stations for carrying out the steps shown in FIGS. 2A–E. The first station is shown in cross-section in FIG. 3 and serves for the upsetting process in accordance with FIG. 2B. In this process pressure is exerted on the upper side 30 of the section 10 by means away plunger 28 which comes from above in FIG. 3 and FIG. 2B and a material flow is generated locally in the section 10 in the region of the axis 24 by means of a die 32 (FIG. 3) arranged beneath the bar section 10, so that a cylindrical recess 34 is produced in the topside 30 of the bar section 10 and a cylindrical projection 36 is produced at the component side 12 of the bar section 10. The volume of the cylindrical recess 34 corresponds to the volume 36 of the cylindrical projection.

As already mentioned, FIG. 3 shows a partly sectioned representation of a first station of progressive tooling 26 which is arranged in a punching press 38, with only a part of the punching press and a part of the progressive tooling being shown.

Specifically one can see in FIG. 3 the lower tool 40 of the punching press which is mounted on a lower frame plate of the punching press and which serves to receive the die 32 and also other parts and the upper frame plate 42 of the punching press on which an upper tool 44 and a hold down member 46 are mounted. Alternatively the plate 42 can be an intermediate plate of the punching press.

As shown the section 10 is supported in the press on all sides.

For this purpose the lower tool 40 has a receiving and support plate 48 which receives the die 32 and supports two further plates 50 and 52 which are arranged to the left and right of the section 10. The plates 50 and 52 form a guide through which the bar section 10 can be moved on further in a direction perpendicular to the plane of the drawing step for step. The hold down member 46 which is pressed downwardly by means of the illustrated springs which are braced against the upper tool 44 is located in contact with the upper sides of the plates 50 and 52 and also with the upper side 30 of the section 10. The hold down member 46 has a cylindrical opening in the form of a stepped bore 56 through which the plunger 28 extends and its end 56 can thus enter into contact against the upper side 30 of the section 10. At its upper end the plunger 28 is held in the upper tool 44 and is pressed downwardly during the closing movement of the press with the compensation pressure piece 58 of the upper frame plate 42 of the press until it has reached the position of FIG. 3 and has thus formed the cylindrical projection 36. The shape of the cylindrical projection is determined by the shape of the die 32. This comprises an outer part 60 which is supported via a pressure piece 62 at the lowest plate 41 of the tool 40 and is thus immovable relative to the lower plate (not shown) of the press, since the plate 41 of the tool 40 is secured to the lower plate of the press.

The outer part 60 of the die has a projection 64 which fits in the U-shaped groove 22 in the lower side of the section 10 in the region of this station of the progressive tooling and has a central circular bore 66 into which the material of the section can flow locally in order to form the ring-projection 36. The projection 64 has a height corresponding to the depth of the U-shaped groove 22 but does not fill out the undercuts 69, 71 at the inner inclined flanks 68, 70 of the two bars 14 and 16 of the section 10, since the section 10 has to be lifted at each step of the process and the undercuts must therefore remain free in the progressive tooling. The die 32 also has a centrally arranged cylindrical post 72, the upper end of which in FIG. 3 supports a part of the lower side of the cylindrical projection 36. The end face of the post 72 can be slightly curved and lie by a smaller amount above the cylinder 76 in order to assist the subsequent deformations of the section 10. The post 72 is immovable and is supported at its lower end on a plate 62. The post 72 is also located within a cylinder 76 arranged concentric to it, the cylinder being supported at its lower end likewise on the pressure piece 62 and having at its upper end a cylindrical ring-surface which lies in a plane with the upper end face 74 of the post 72 and with the latter forms the lower limit for the cylindrical projection 36 formed by the action of the plunger 28.

Beneath the plate 62 and in a stepped bore 82 of the lowest plate 41 of the tool 40 there is located a moveable pressure piece 84 which is biased upwardly by a spring 86 co-concentrically arranged in the stepped bore 82. Above the pressure piece 84 there are three cylindrical pins 88 of which only two can be seen in FIG. 3, which are displaced angularly by 120 degrees relative to another about the central longitudinal axis 24 and extent through corresponding bores in the pressure piece 62 and contact the lower end face 90 of the cylindrical part 76 of the die.

During the upsetting process the force of the plunger 28 (produced by the punching press) is sufficient in order to press the cylindrical part of the die 67 downwardly through material flow in the section 10 into the illustrated position, so that the pressure piece 84 likewise adopts the position shown in FIG. 3.

During the opening of the punching press, in order to carry out the next stroke of the punching press, the upper tool 44 moves with the plunger 28 and, offset phase-wise, the hold down member 46 moves upwardly away from the plates 50, 52. The force of the spring 86 is then sufficient in order to shift the cylindrical part 76 of the die upwardly via the pressure piece 84 and the pins 88 so that its upper ring-like end-face 78 lies flush with the upper side of the projection 78 and the section 10 is thereby lifted so that the cylindrical projection 36 is no longer arranged recess in the die, but rather located above the die, so that it can be further transported into the next station of the progressive tooling (not shown). In addition the plates 50 and 52 are moved horizontally apart from one another via a slider system mounted at the side in order to more easily lift the section 10. For example, sliders can be fixedly attached to the right and left sides of the upper tool 44 in FIG. 3 (only one slider shown) with the sliders being guided with their lower ends in respective guides 53 in the lower receiving plate 48 and having inclined surfaces 55, 57 in the region of the plates 50, 52 which cooperate with corresponding inclines surfaces 59, 61 at openings of the plates in order to bring about the movement of the plates in accordance with the double arrows shown in the plates for each stroke of the press. During this a new portion of the section 10 enters into the region of the dies 32 so that through closing of the press a further cylindrical projection 36 can be produced. The section of the section 10 which was previously located in the upsetting station of the progressive tooling now has the cross-sectional shape of FIG. 2B, for which it is to be said that the volume of the ring-like recess 34 corresponds to the volume of the cylindrical projection 36.

Figure 2B:
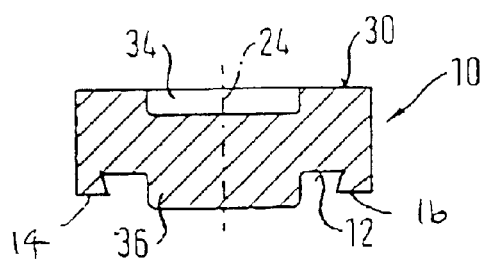
Figure 2C:
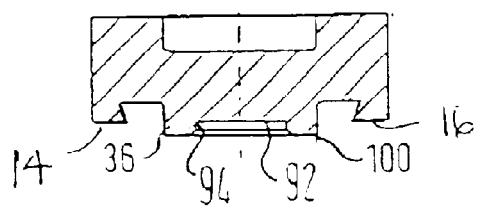

In the next station of the progressive tooling (not shown) the section of FIG. 2B is now indented, i.e. provided with the ring-like recess 92 of FIG. 2C. This ring-like recess or indentation 92 defines a breakaway edge 94, which is of advantage in order to achieve a clean punching edge for the slug 96 while forming the punched aperture 98 in accordance with FIG. 2D in the next station of the progressive tooling.

In order to generate the indentation 92 of FIG. 2C the progressive tooling has in the second station in principal the same design as in the drawing of FIG. 3 except that the central post 72 has a shape at its upper end corresponding to the indentation 92 and projects by the axial depth of the indentation above the upper end face 78 of the cylindrical part 76 of the die. Under some circumstances it is possible to achieve the formation of the indentation simultaneously with the generation of the cylindrical projection 36. This is however not preferred, since during the formation of the indentation one simultaneous re-corrects the shape of the cylindrical projection 36 so that it has a precisely defined sharp shape in the region of the edge 100.

Figure 2D:
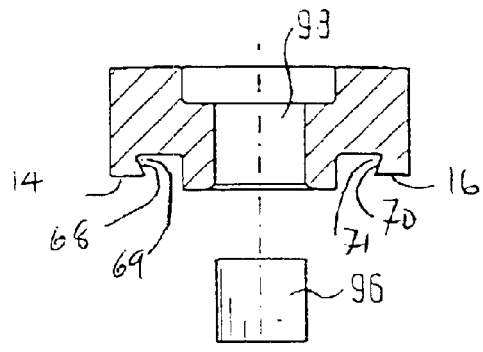

After the formation of the indentation 92 and the correction of the shape of the cylindrical projection 36 the section is once again lifted out of the die and transported by a further step to a station where the punching of the aperture takes place in accordance with FIG. 2D. This station is also in principal designed similar to FIG. 3, excepted here the central post 72 is missing and the station has instead a bore which forms a passage for disposal of the slug 96.

Figure 2E:
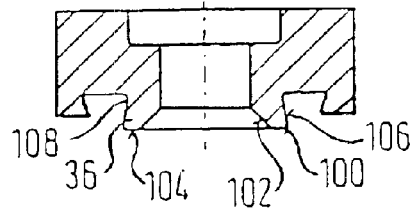
Figure 2F:
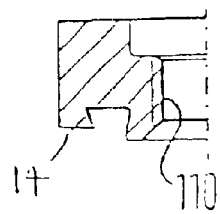

After the manufacture of the punched aperture in accordance with FIG. 2D the section is again lifted out of the corresponding die and transported by a further step to a station where the dilation process is carried out so that the cylindrical projection 36 receives the shape which is shown in FIG. 2E. One notes that the lower end face of the cylindrical projection 36 is provided with a conical recess 102 which forms a chamfer, with the conical form diverging in the direction of the free end face 104 of the cylindrical projection 36. In order to achieve this shaping the corresponding station of the progressive tool is in principal also designed in accordance with FIG. 3, except that here the central post 72 is provided with a corresponding conical chamfer in the region of its upper end.

In other respects, a free space (not shown) is provided in the region of the outer die 60 so that during the formation of the conical recess 102 the outer sidewall 106 of the cylindrical projection 36 receives the conically downwardly diverging shape of FIG. 2E and hereby forms a ring-like undercut 108 around the ring projection 36.

This undercut is, however, not essential. Indeed the dilation step, which forms the undercut 108, could be omitted, in particular wenn the conical recess 102 is formed during the indentation process. The ring-like piercing station would then have the right cylindrical form (outer shape) of FIG. 2D or FIG. 14C. An undercut in the region of the piercing section, as shown at 108 in FIG. 2E is not necessary, since the undercuts 69 and 71 ensure the required press-out resistance. An undercut such as 108, however acts to produce an even greater press-out resistance but makes the manufacture slightly more expensive through the additional dilation step.

After the dilation process in accordance with FIG. 2E the section 10 is again lifted out of the die, here also by a cylindrical part of the die similar to the part 76, and the section is transported by a further step and indeed into the region to a last station of the progressive tooling where a portion of the section is cut off having the length of the element 11 of FIG. 4. The so manufactured element with the punched aperture 98 is now transported into an apparatus where the thread 110 is bored in a known manner in accordance with FIG. 2F. In some applications the hollow body element is left without thread. For example the punched aperture 98 could be intended as a guide or could be designed to receive an inserted part. Moreover, in motor-car construction, thread cutting or thread forming screws are frequently used, so that the thread 110 is first provided after the attachment of the hollow body element to a sheet metal part, with a thread being provided using such a thread cutting or thread forming screw.

Various modifications are possible. On one hand the cutting to length of the individual elements from the section can take place before the dilation process of FIG. 2E, with the dilation process then also serving to correct the actual shape of the element in the sense that any deformations during the cutting the length of the element are corrected.

Furthermore it is possible to carry out the upsetting process with a plunger which has a diameter in the region of its end carrying out the upsetting which is at least substantially the same as the diameter of the hole punch for the carrying out of the whole punching process. This has two advantages. On the one hand, the diameter of the ring-like recess 34 is then of the same size as the diameter of the subsequent punched aperture 98, so that the region of the recess 34 can form a part of the thread cylinder and the constructional height of the element can be made correspondingly smaller. Since the cylindrical projection 36 receives the shape of FIG. 2B and the volume of the cylindrical projection 36 corresponds to the volume of the cylindrical recess 34 the axial length of the cylindrical recess 34 becomes larger as a result of the smaller diameter of the plunger 28, so that the thickness of the region of the section which has to be pierced during the aperture forming process in accordance with FIG. 2D is smaller and the aperture forming process is easier to carry out, so that the wear at the hole punch is less.

When the method is so carried out as shown in FIGS. 2A to 2E a nut element 11 arises with the shape in accordance with the FIGS. 4A to 4F. The corresponding reference numerals from the previous figures are entered here and are thus to be understood in accordance with the previous description.

FIG. 4B specifically shows the cross-section through the nut element 11 of FIG. 4A at the section plane B—B whereas FIG. 4C shows the cross-section perpendicular thereto in accordance with the section plane C—C. The FIG. 4D shows the perspective illustration of the element 11 from the right hand side and from the front in a view taken obliquely downwardly, whereas the FIG. 4E shows a perspective representation of the nut element 11 from the lower side.

Figure 4F:
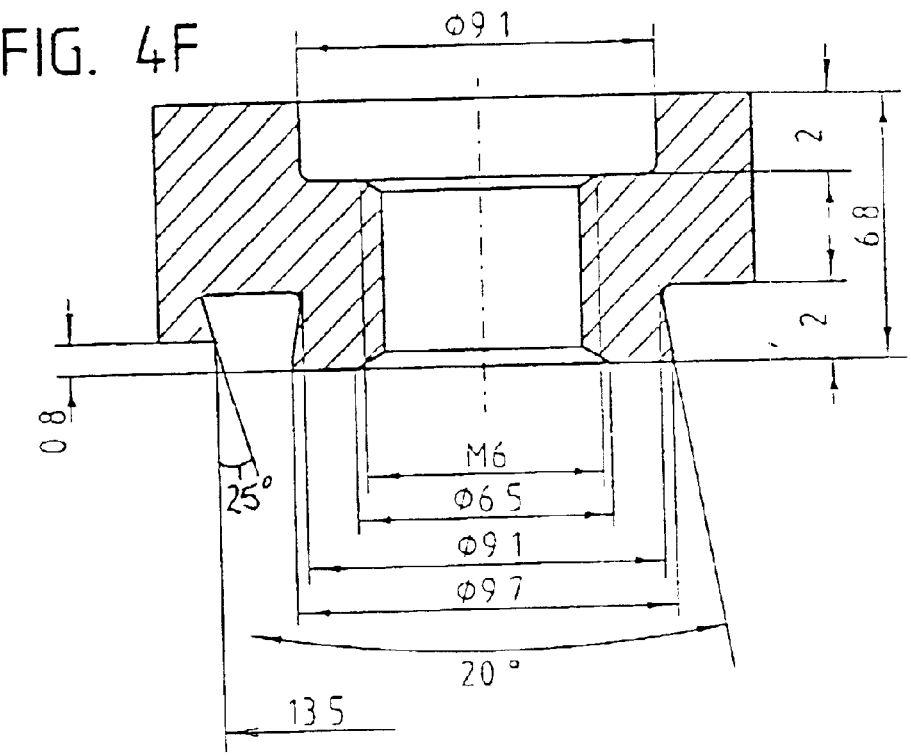

FIG. 4F recites the specific dimensions of the element when the thread is designed for an M6-screw. In the illustration of FIG. 4F the left and half of the cross-section drawing corresponds to the left hand side of FIG. 4B, whereas the right hand half of the sectional drawing in accordance with FIG. 4F corresponds to the half cross-section of the element 11 in the direction of the longitudinal direction L of the original section.

Figure 5:
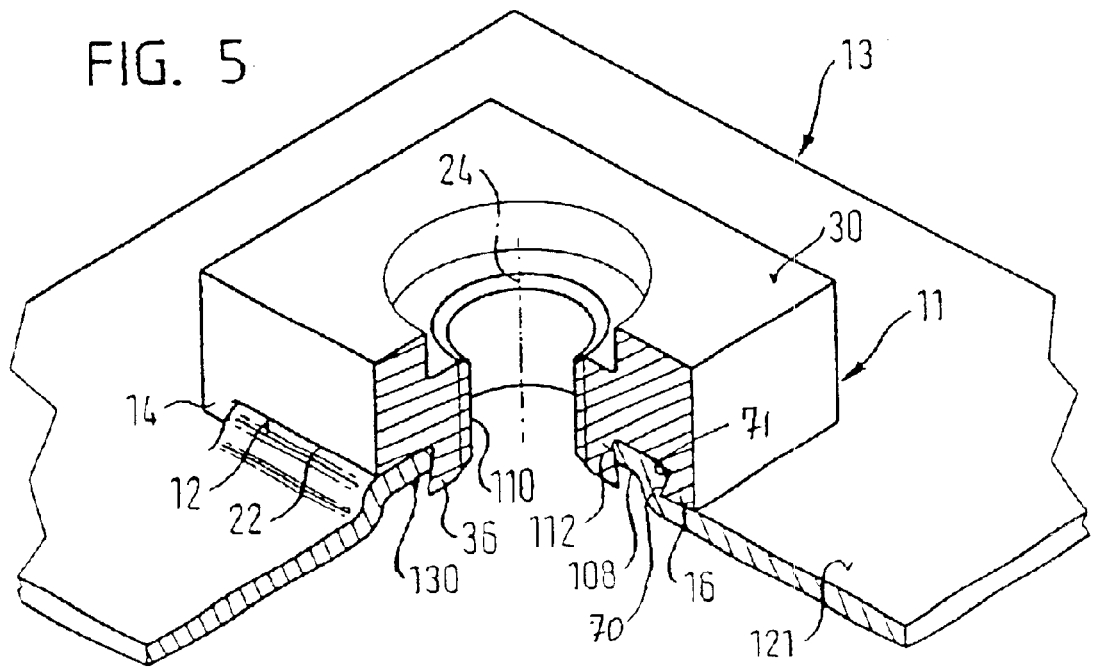

FIG. 5 now shows a component assembly comprising an element in accordance with FIG. 4 after the attachment to a component 13 in the form of a sheet metal part. One notes that the sheet metal has been deformed in the region of the lower side 12 of the element into the recess which is formed around the ring projection 36 within the U-shaped groove 22 between the bars 14 and 16. In this arrangement the sheet metal engages both in the undercuts 69 and 71 (only 71 shown in FIG. 5) and also in the undercut 108 around the cylindrical projection 36, so that a form matched engagement takes place here and the element 11 cannot any longer be removed from the sheet metal part 13 in the axial direction 24 without the use of destructive forces. Through the forming of the sheet metal of the component 13 into the U-shaped groove 22 between bars 14 and 16 the element 11 is prevented from rotating relative to the component 13, i.e. the element is able to withstand any turning forces which can arise through the introduction of the screw into the thread 110.

Since the aperture 112 in the component 13 is circular no notches arise here which could lead, as a result of notch action to a premature failure of the component assembly by fatigue effects or cracks. A notch action in the region of the ends of the bars is not to be expected since the ends are rounded off by the separation from the section strip and, as a result of the contact surface, do not produce any notches in the sheet metal part in the region of the bars. Situations are avoided in which the bars bury themselves into the component and hereby produce notch action. For this purpose the contact surfaces for the component formed by the lower side of the bars are made so large that the surface pressure lies below the yield point of the component. The aperture 112 is produced during the attachment of the element by the ring-like projection 36 acting as a piercing section, for this purpose the die in accordance with FIGS. 6A–6C is necessary.

As can be seen from FIG. 6B the die 114 has an essentially cylindrical, circularly round shape but is rather provided at one side with a flattened portion 116 which serves as a feature of shape which insures a correct orientation of the die in the tool. It is namely necessary that the projection 118 at the end face 120 of the die, which is rectangular in outline, is aligned with the U-shaped groove 22 of the element 11. This correct alignment or orientation, i.e. about the axis 25 of the die, which must be aligned with the axis 24 of the element during its attachment, is insured by means of the flattened portion. The elements must also have the correct orientation around the axis 24 in the setting head which is used for the attachment, which can be straight forwardly insured by the setting heads known per se.

For the attachment of the element 11 to the component 13 the component 13 is normally positioned in a press, the element 11 is placed by a setting head and coming from above on the component 13 and the component 13 is supported at the other side on the end face of the die. During closing of the press the hold down member of the setting head first moves in a manner known per se against the upper side 122 of the sheet metal part 13 and presses this into contact with the end face 120 of the die. The setting head then moves the element 11 against the upper side 120 of the sheet metal part, with the central axis 24 the element 11 being coaxially positioned relative to the central axis 25 of the die. Since the ring projection 36 projects downwardly beyond the lower side of the bars 14 and 16 the end face of the ring projection 36 is the first thing to contact the sheet metal part and cooperates with the cutting edge 122 of the projection of the die in order to cut a slug out of the sheet metal part 13, with this slug then being disposed of through the central bore 124 of the die. The projection 118 of the die then presses the sheet metal part into the U-shaped groove 22 and the ring-like nose 126 of the die, which projects slightly above the plateau region 128 in the four corners of the projection 118, presses the sheet metal of the component 13, in the edge region of the punched aperture 112 which has arisen through the punching out of the slug, into the recess around the ring protection 36 and simultaneously deforms the sheet material so that a ring-like recess 130 in the sheet metal part results and the sheet material flows into the undercuts 69, 71 and, when present, into the ring-like undercut 108. Instead of a press, a robot or other tool can be used to attach the element 11 to the component 13, the robot or other tool holding the element in the right position relative to the die and applying the necessary force.

Figure 7:
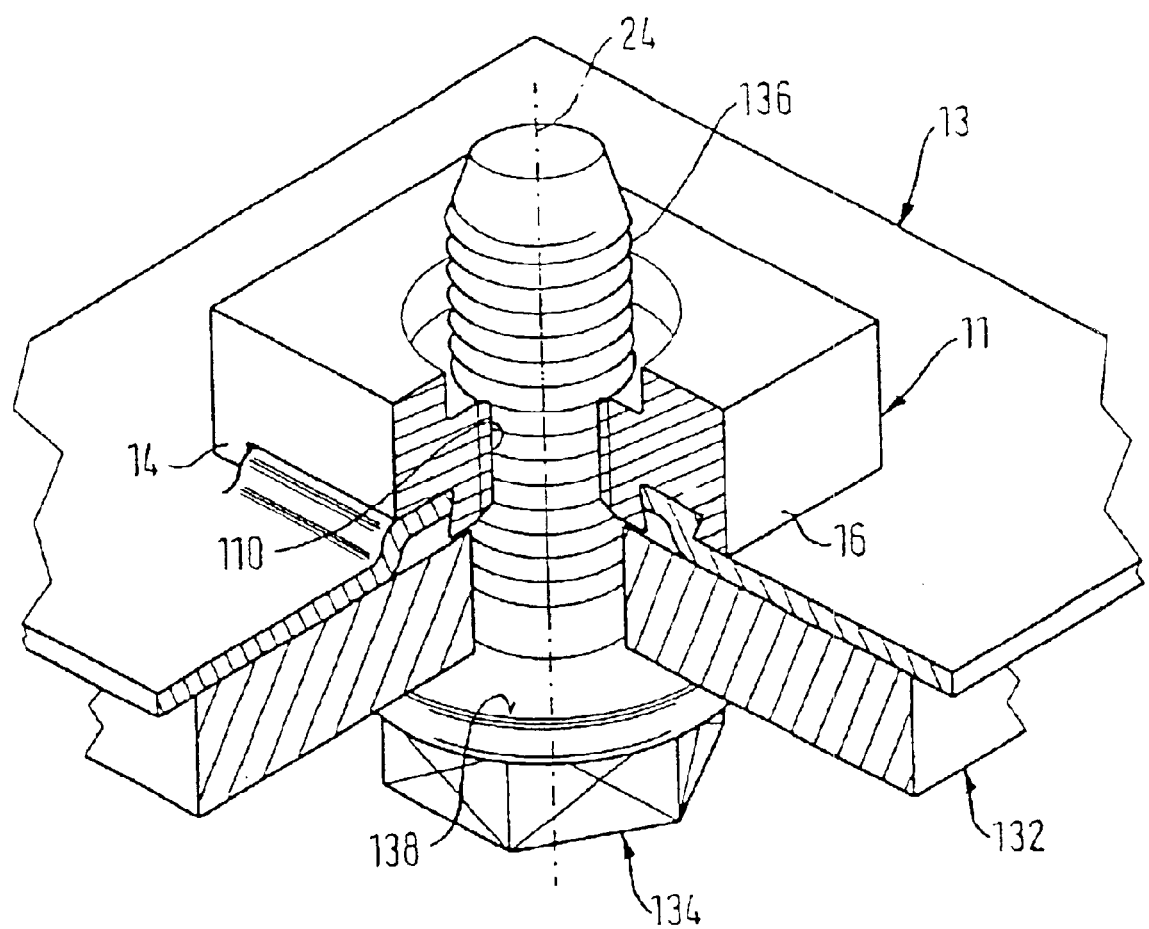

FIG. 7 now shows how a further component 132 can be screwed by means of a screw 134 to the component 13. The further component 132 is namely attached to the side of the component 13 which is remote from the element 11, with the thread 136 of the screw 134 engaging into the thread 110 of the element 11. The contact surface 138 of the screw, or of a possibly provided washer (not shown) presses the further component 132 against the component 13 so that the component 13 is trapped between the bars 14 and 16 of the element and the further component 132. In this connection the axial height of the ring projection 36 in the axial direction 24 is selected so that it does not hinder an intimate contact of the further component 132 on sheet metal part 13, i.e. the cylindrical projection 36 projects by the maximum amount of the sheet metal thickness of the component 13 beyond the lower side of the bars 14 and 16. With this design an extremely high security against rotation is achieved. Furthermore, the screw 34 pulls the element firmly against the sheet metal part 13 so that an axial separation of these two parts in the axial direction 24 is not possible.

A further embodiment of the section of the invention and of the hollow body element of the invention will now be described with reference to the drawings of FIGS. 8 to 12.

For this description the same reference numerals are used as in the first embodiment of FIGS. 1 to 7, but increased by the basic number 200. Parts that are provided with the same reference numerals, i.e. after subtraction of the basic number 200, have the same function or the same design as the corresponding parts of the first embodiment in accordance with FIGS. 1 to 7, so the description given there also applies for the corresponding parts of this embodiment, unless something to the contrary is stated. It is principally the differences which will be described.

Figure 8:
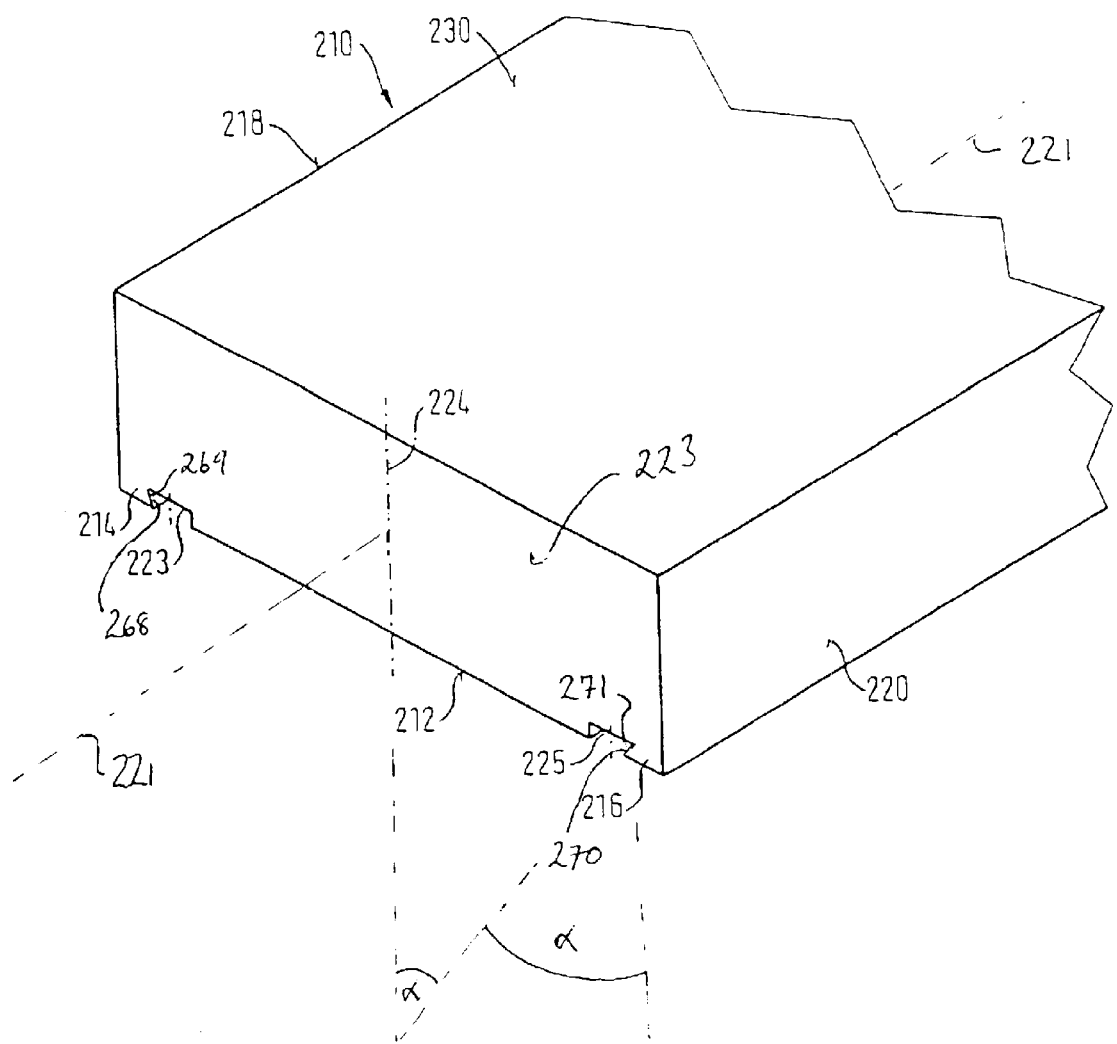
Figure 10:
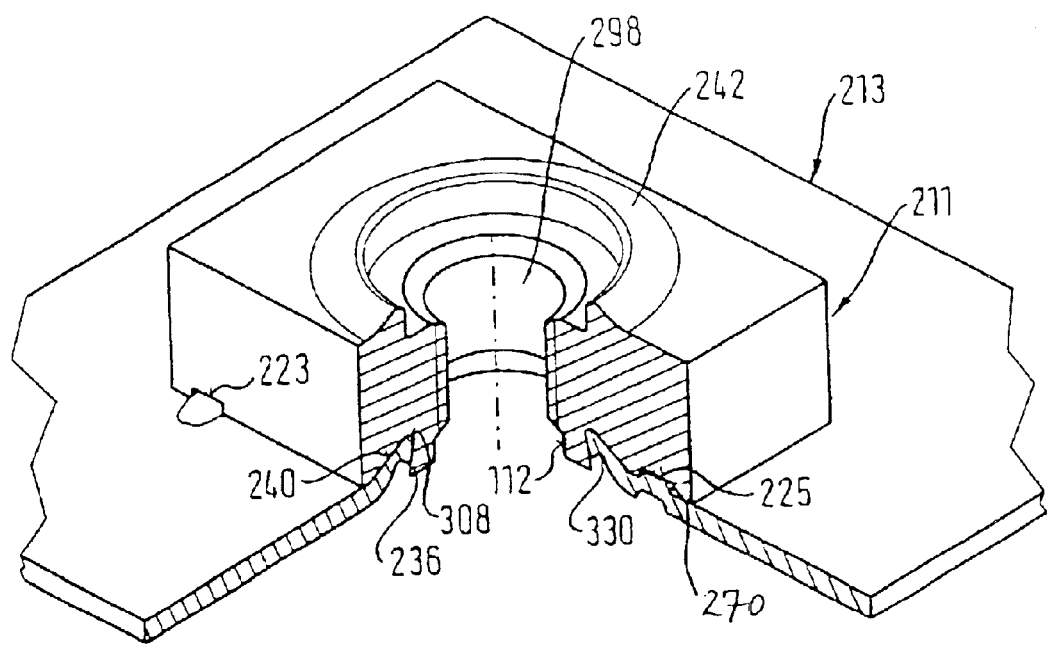
Figure 11:
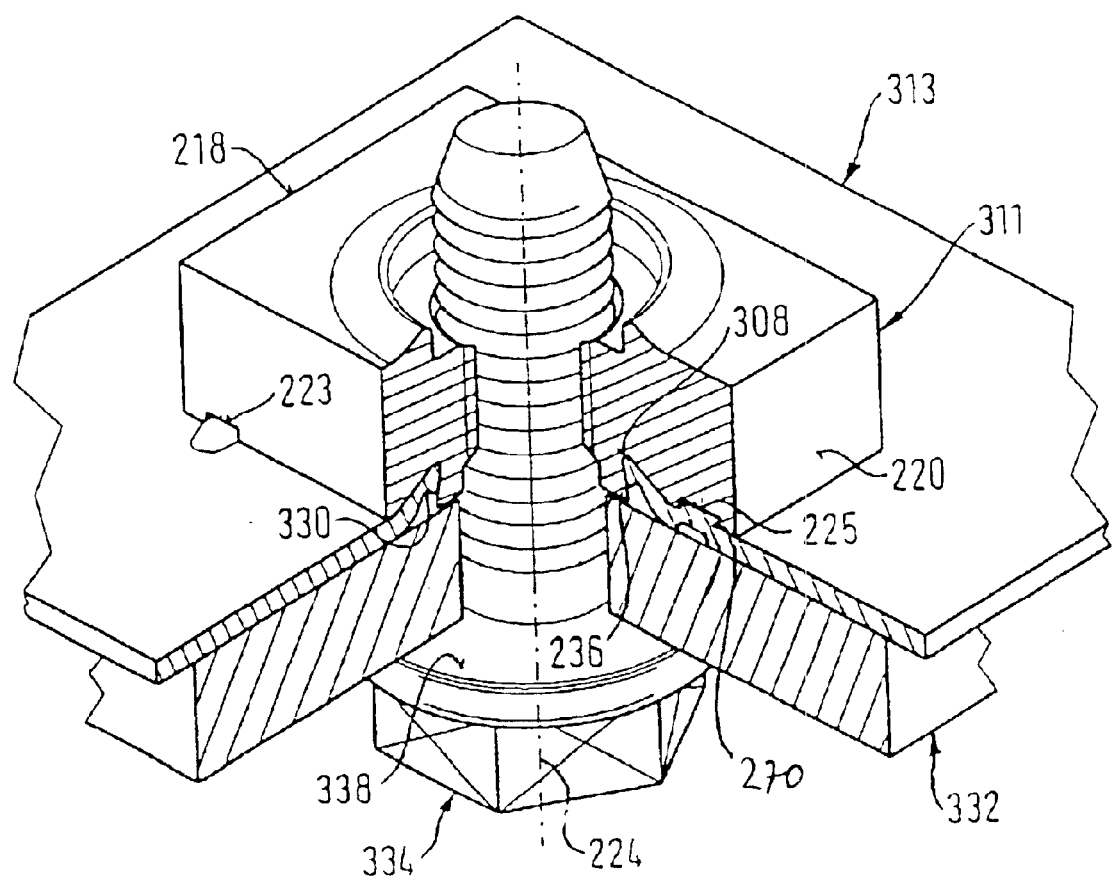

The section 210 of FIG. 8 also has a substantially rectangular cross-section here, with two grooves 223 and 225 being formed by a cold rolling process in the component side 212 of the section in contrast to the embodiment of FIG. 1, the two grooves respectively having trapezoidal cross-sections with one inclined flank and extending parallel to the longitudinal sides 218 and 220 respectively of the section 210. Thus two bar-like regions 214 and 216 are also formed here with respect inclined flanks 268 and 270 forming undercuts 269 and 271 respectively.

The section 210 of FIG. 8 is processed in a punching press by means of progressive tooling similar to the previously described progressive tooling in order to produce the nut elements of FIGS. 9A to 9E.

During the manufacture of the nut element 211 in accordance with FIGS. 9A to E the progressive tooling has a further station in comparison to the previously described progressive tooling. In this additional station, which forms the first station when the section runs in, a conical recess 240 is first pressed in the lower side 12 of the section, in a type of inverse upsetting process, whereby a corresponding conically raised portion 242 arises at the upper side 230 of the section, with both the conical recess 240 and also the conically raised portion 242 being arranged concentric the axis 224 of the element. After formation of the conical recess 240 and the conically raised portion 242 in the first station of the progressive tooling the cylindrical recess 234 and the cylindrical projection 236 and subsequently the indentation 292 and the punched aperture 291 are produced in further stations of the progressive tooling in the same way and means as this was described in connection with the FIGS. 2 and 3. The undercut 308 can also be omitted here when a right cylindrical piercing section is desired. In the last station of the progressive tooling the element 211 is then separated from the bar section by a shearing process.

The precise end shape of the hollow body element can clearly be seen from the FIGS. 9A to 9E. The attachment of the element 211 to a component 213 takes place using a die 114 in accordance with the FIGS. 12A and B which has several things in common with the die of FIGS. 6A to 6C. First of all it should briefly be pointed out that the sectional drawing of FIG. 12A here shows two section planes which each show a half section corresponding to the arrows A—A in FIG. 12B.

Figure 12A:
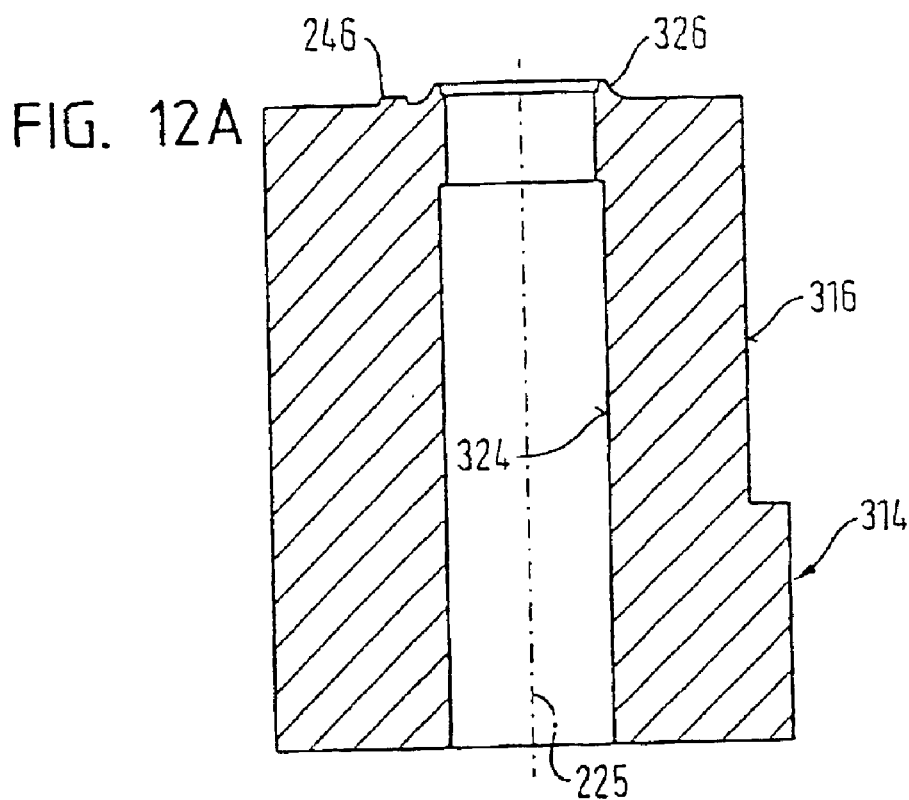
Figure 12B:
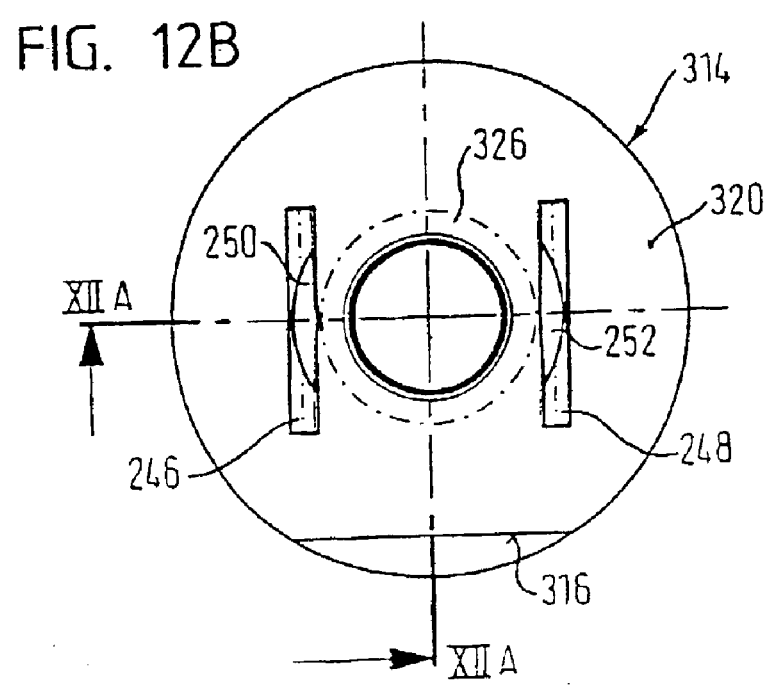

Notable in the die 314 FIGS. 12A and B is, above all, that it has two bar like projections 246 and 248 which extend in parallel to another and are formed corresponding to the U-shaped grooves 223 and 225 in the lower side of the section, with the widths of the bars 248 being smaller by the double thickness of the component than the widths of the corresponding grooves 223 and 225.

The ring projection 236 at the center of the end face of the die 314 is circularly round in plan view here, with the manufacture of the ring projection 326 leading to respective arched cut-outs 250 and 252 in the two bars 246 and 248 respectively. The axial height of the ring projection in the die 314 is thus larger in this embodiment than in the die of FIGS. 6A–C, since it projects directly out of the end face 320 and not, as in the embodiment of FIGS. 6A–C, out of a rectangular projection.

During the attachment of the element 211 to the component 213 utilizing a setting head, for example in a press, in a robot or in another type of tool, the bar like noses 246 and 248 of the die press the sheet material into the two U-shaped grooves 223 and 225 of the element 211 and into the undercuts 269 and 271 and hereby form noses providing security against rotation in the sheet metal part 213 which project into the corresponding grooves 223 and 225. The marginal region 112 around the punch hole in the sheet metal part is in this embodiment pressed into the conical recess 240 around the cylindrical projection 236 and is simultaneously deformed into the undercut 308, with the flow of the sheet metal material into this undercut 308 as well as into the undercuts 269 and 271 being improved by the ring projection 326 of the die, which leads to a ring-like recess 330 in the sheet metal part around the cylindrical projection 236.

The attachment of a further component 332 takes place here in a manner similar to the embodiment of FIG. 7 using a screw 334. Here the further component 332 is also attached to the side of the component 313 remote from the element 311. It is particularly favourable in this embodiment that the element 311 has a very large contact surface for the component 313, since the grooves 223 and 225 and also the ring recess 240 only take up a smaller proportion of the lower side of the element 311 area-wise than is the case in the previous embodiment. For this reason the element 311 can be made some smaller for the same contact surface than in the case of the element of the first embodiment, so that a weight saving is hereby achieved.

A third embodiment will now be described and indeed with reference to the further drawings 13 to 17.

For this description the same reference numerals are used as in the first embodiment of FIGS. 1 to 7 but increased by the basic number 400. Parts which are provided with the same reference numerals, i.e. after subtraction of the basic number 400, have the same function and the same design as the corresponding parts of the first embodiment of the FIGS. 1 to 7, so that the description given now also applies for the corresponding parts of this embodiment unless something to the contrary is stated. It is principally the differences which will be described.

Figure 13:
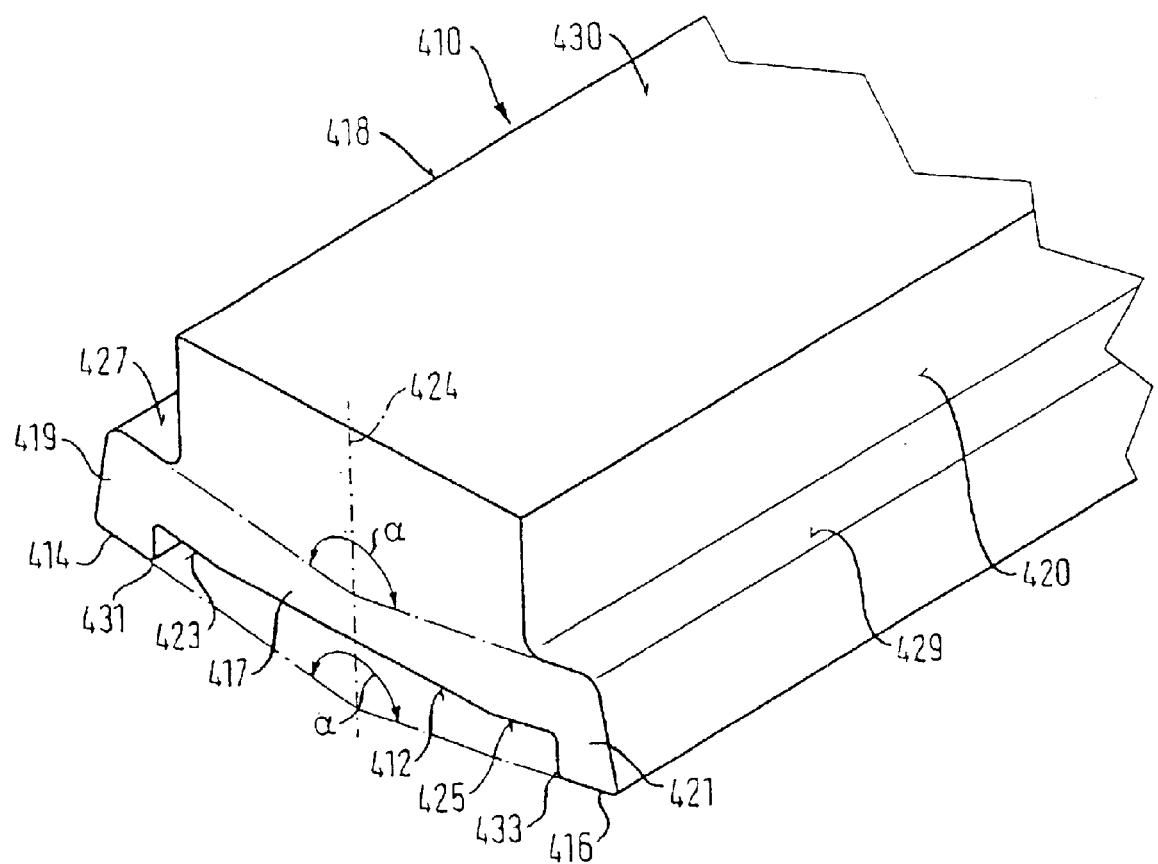

In the third embodiment of FIG. 13 the section 410 has a central region 417 with a substantially rectangular cross-section and, to the left and right of this, integral wings 419 and 421 which extend at the component side 412 beyond the central region 417 and there form two bars 414 and 416 which extend parallel to the longitudinal sides 420 of the section and merge via an oblique recess 423, 425 respectively into the lower side of the central region 417 of the section. In this arrangement the upper sides 427 and 429 of the two wings 419 and 421 respectively have a clear spacing from the upper side 430 of the central region 417 of the section 410 and hereby form shoulders which stand oblique to the sidewalls of the central region and include an angle α with one another which, related to the sidewall 430 of the section remote from the component side 412 is somewhat smaller than 180° and preferably lies in the range from 175° to 160°.

The lower sides of the bars 414 and 416 are set obliquely in accordance with the shoulders 427 and 429, i.e. form the same angle α to one another. The oblique transition regions 423 and 425 are likewise parallel to the oblique surfaces formed by the shoulders 427 and 429 so that they also form a corresponding angle α with one another. This oblique position of the wings 419 and 421 respectively relative to the central region 417 takes place during the manufacture of the section 410 by cold rolling and has a special advantage, which will be explained somewhat later.

Apart from the special design of the wings 419 and 421 the shape of the section 410 corresponds essentially to the embodiment of FIG. 1 and the manufacture of the nut elements from the section 410 takes place in principal in the same way and means as the manufacture of the nut elements in accordance with FIG. 4 as was previously described with reference to the FIGS. 2 and 3. The manufacturing process will thus not be explained here in detail. One can see however from the FIGS. 14A to 14E, which show the nut element in the finished form, and from the reference numerals used there, that this element has a large similarity to the element of FIGS. 4A to F.

One distinction here however lies in the fact that the cylindrical projection 436 has no undercut, this is however not essential and the ring projection 436 could have the same form as the corresponding projection 36 of the embodiment of FIG. 4.

Figure 17A:
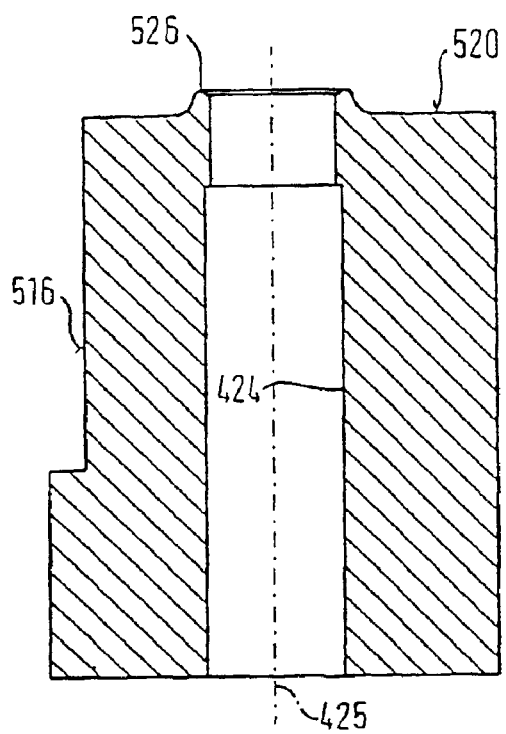
Figure 17C:
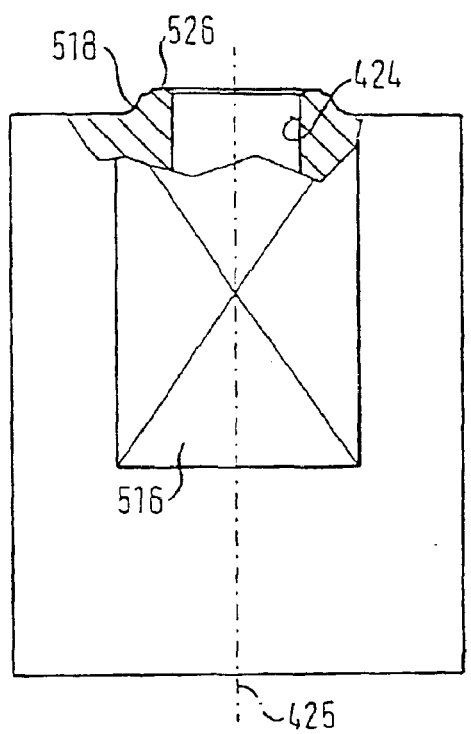
Figure 17B:
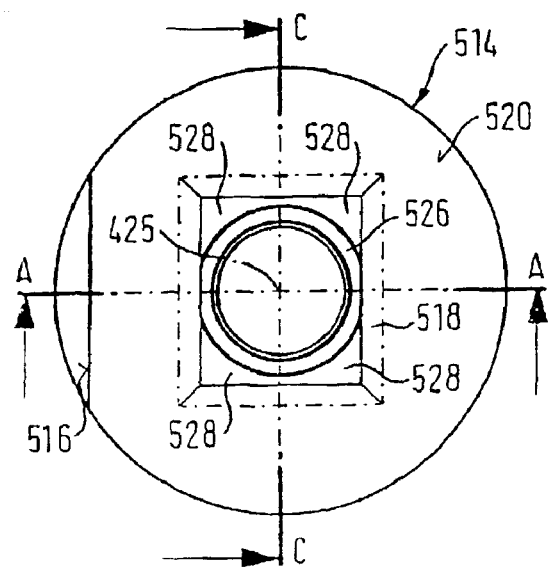

The attachment of the element 411 to the component 413, so that the component assembly 415 arises, also takes place here using a die 514, and indeed the die of FIGS. 17A to C which is identical with the die 114 of FIGS. 6A to C and must not be described more closely here, since the description for the embodiment of FIGS. 6A to C also applies here. In FIG. 17 the same reference numerals are used as in FIGS. 6A to C but are simply increased by the basic number 400.

Figure 15:
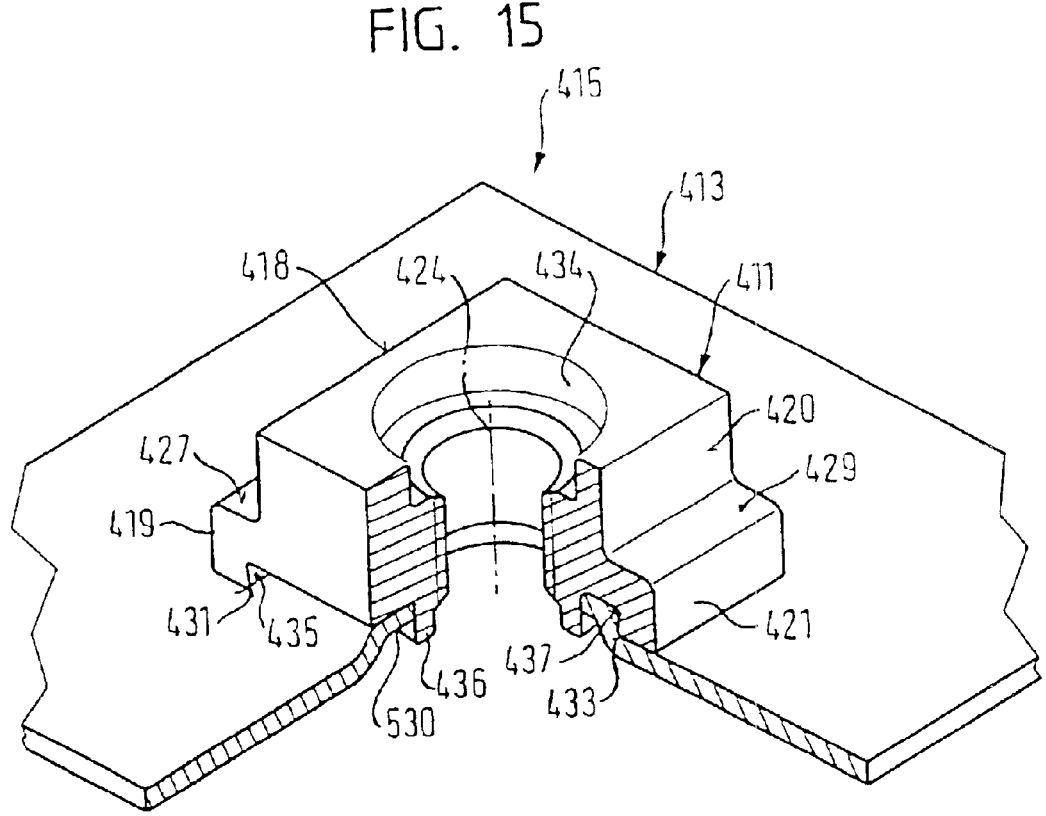

During the attachment of the element 411 for the formation of the component assembly of FIG. 15 a setting head is however used in this embodiment which permits the wings 419 and 421 to be, so to say pressed flat, so that the shoulders 427 and 429 respectively no longer form an angle α of less than 180° with one another but now lie in one plane. In this way the wings 419 and 421 respectively are, so to say, pivoted about the pivot axis in the region of the inner ends of the inclined surfaces 423 and 425 respectively, so that the inner side edges 431 and 433 of the bars 414 and 416 move towards from another and in the installed state have a smaller spacing from one another than before the attachment 411. That signifies that an undercut 435 and 437 respectively (FIG. 15) is now retrospectively formed in the region of the inner side surfaces 468 and 470 of the bars 414 and 416 respectively and that the sheet material now engages in form fitting manner into this undercut, so that an axial separation of the element 411 from the component 413 in direction of the axis 424 is no longer possible. If the cylindrical projection 436 of the element 411 is also formed with an undercut the pivotal movement of the wings 419 and 421 leads to the sheet material (also) being pressed into this undercut whereby an even more secure attachment of the element 411 to the component 413 takes place, i.e. the embodiment has a very high pull-out-resistance.

Figure 16:
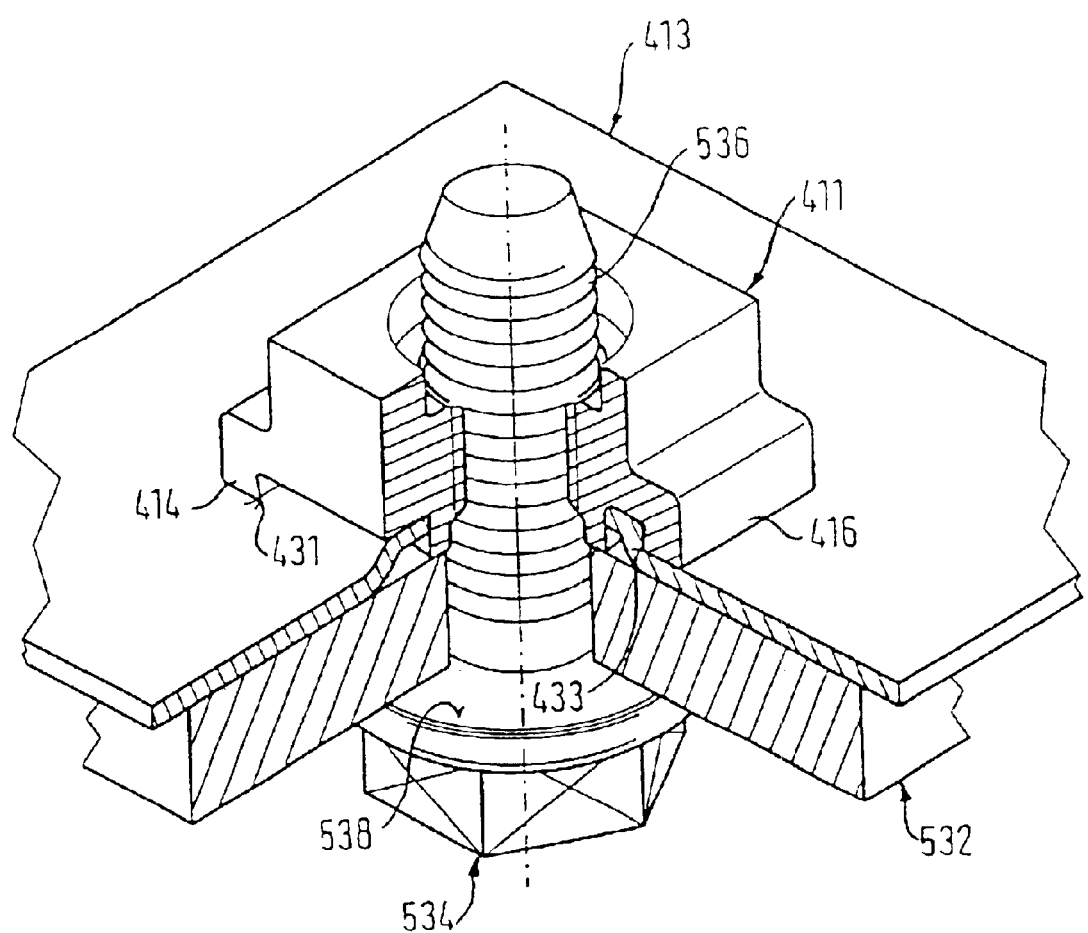

The situation during the attachment of a further component 532 is then as shown in accordance with FIG. 16 and is in principal to be created with the assembly situation of FIG. 7, which is provided by the use of the same reference numerals (however increased by the basic number 400).

The functional elements described here can for example be manufactured from all materials which achieve the strength class 5.6 or higher. Such metal materials are normally carbon steels with 0.15 to 0.55% carbon content.

In all embodiments all materials can be named as an example for the material for functional elements which achieve, in the context of cold deformation, the strength values of class 8 in accordance with the ISO standard, for example a 35B2-alloy in accordance with DIN 1654. The fastener elements so formed are suitable for all commercially available steel materials for sheet metal parts which can be drawn as also for aluminium or its alloys. Aluminium alloys, particularly those of high strength can also be used for the functional elements, for example AlMg5. Higher strength magnesium alloys such as for example AM50 can also be considered for the functional elements.

What is claimed is:

1. An element for attachment to a component consisting of sheet metal, said element having a rectangular or square shape in plan view, with a lower component engaging face and an upper face remote from said lower face, first and second opposed longitudinal sides and third and forth opposed transverse sides extending between said first and second opposed longitudinal sides, first and second bars provided at said lower component engaging face and disposed at and aligned parallel to said first and second longitudinal sides, a centrally arranged aperture extending perpendicular to said lower component engaging face, a cylindrical component piercing projection present at said lower component engaging face and disposed concentric to said aperture, and a recessed region present between said first and second bars and said cylindrical component piercing projection, said first and second bars each having an inclined flank extending between said third and forth sides forming an undercut at a side facing said cylindrical component piercing projection.

2. An element in accordance with claim 1, wherein first and second grooves are provided in said component engaging face spaced inwardly of and aligned parallel to said first and second longitudinal sides, thereby defining said first and second bars and said recessed region being present between said first and second grooves.

3. An element in accordance with claim 1, said first and second bars forming contact surfaces for said component which are sufficiently large that a surface pressure at said surfaces arising in use lies below a yield limit of said component.

4. An element in accordance with claim 3, said recessed region being a conical recess diverging in a direction going towards said component engaging face.

5. An element in accordance with claim 4, wherein a conical ring shoulder is provided at said upper face and has an approximately complementary shape to said conical recess.

6. An element in accordance with claim 1, each of said inclined flanks forming an angle α with a central axis of said cylindrical component piercing projection in a plane perpendicular to a central longitudinal axis of said element and containing said central longitudinal axis, said angle α lying in the range between 3° and 45°.

7. An element in accordance with claim 6, wherein said angle α lies in the range between 7° and 30°.

8. An element in accordance with claim 1, said cylindrical component piercing projection having a free end face projecting further from said component engaging face than said bars.

9. An element in accordance with claim 1, said recessed region between said bars having a boundary and being at least substantially rectangular in outline and said cylindrical component piercing projection being arranged at a centre of said recessed region and having a spacing from said boundary of the recess at all sides.

10. An element in accordance with claim 1, said cylindrical component piercing projection being at least substantially circularly cylindrical.

11. An element in accordance with claim 1, said cylindrical component piercing projection having a free end face and an at least substantially conical outer wall which diverges going in a direction towards said free end face thereby forming a piercing edge with said free end face, said conically diverging outer wall forming an undercut.

12. An element in accordance with claim 1, said cylindrical component piercing projection having a free end face and a conical recess forming a chamfer in said free end face, said conical recess diverging in the direction towards said free end face.

13. An element for attachment to a component consisting of sheet metal, said element having a rectangular or square shape in plan view, with a lower component engaging face and an upper face remote from said lower face, first and second opposed longitudinal sides and third and forth opposed transverse sides extending between said first and second opposed longitudinal sides, first and second grooves provided at said lower component engaging face spaced inwardly of and aligned parallel to said first and second longitudinal sides whereby first and second bars are formed at and extending parallel to said first and second longitudinal sides, a centrally arranged aperture extending perpendicular to said lower component engaging face, a cylindrical component piercing projection present at said lower component engaging face and disposed concentric to said aperture, and a recessed region present between said first and second grooves and surrounding said cylindrical component piercing projection, said first and second bars each having an inclined flank extending between said third and forth sides forming one side of the respectively associated first and second grooves.

14. Component assembly comprising a component and an element attached thereto, said element having a rectangular or square shape in plan view, with a lower component engaging face and an upper face remote from said lower face, first and second opposed longitudinal sides and third and forth opposed transverse sides extending between said first and second opposed longitudinal sides, first and second bars provided at said lower component engaging face and disposed at and aligned parallel to said first and second longitudinal sides, a centrally arranged aperture extending perpendicular to said lower component engaging face, a cylindrical component piercing projection present at said lower component engaging face and disposed concentric to said aperture, and a recessed region present between said first and second bars and said cylindrical component piercing projection, said first and second bars each having an inclined flank extending between said third and forth sides forming an undercut at a side facing said cylindrical component piercing projection, said component being formed into said undercuts formed by said inclined flanks of said first and second bars and into said recessed region adjacent to the said bars and to said cylindrical component piercing projection, said element being hereby latched to said component in a manner secure against press-out and relative rotation.

15. Component assembly in accordance with claim 14, said component being moulded into an undercut formed by said cylindrical component piercing projection.

16. Component assembly in accordance with claim 14, said component having a ring-like recess in said recessed region around said cylindrical component piercing projection.

* * * * *